(12) United States Patent
Howcroft

(10) Patent No.: US 9,160,970 B2
(45) Date of Patent: *Oct. 13, 2015

(54) SYSTEM AND METHOD TO VALIDATE RESTRICTION EVENT CONTROL STREAMS SENT TO A VIDEO DISTRIBUTION SYSTEM

(75) Inventor: Jerald Robert Howcroft, Beverly Hills, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 480 days.

This patent is subject to a terminal disclaimer.

(21) Appl. No.: 13/569,610

(22) Filed: Aug. 8, 2012

(65) Prior Publication Data

US 2012/0304218 A1    Nov. 29, 2012

Related U.S. Application Data

(63) Continuation of application No. 12/413,993, filed on Mar. 30, 2009, now Pat. No. 8,266,647.

(51) Int. Cl.
*H04N 7/16* (2011.01)
*H04N 7/167* (2011.01)
*H04N 7/10* (2006.01)

(52) U.S. Cl.
CPC ..................................... *H04N 7/16* (2013.01)

(58) Field of Classification Search
USPC ................................ 725/25, 27–29
See application file for complete search history.

(56) References Cited

U.S. PATENT DOCUMENTS

| | | | |
|---|---|---|---|
| 7,958,524 B2 * | 6/2011 | Juneau | 725/14 |
| 8,011,012 B2 * | 8/2011 | Carle et al. | 726/27 |
| 8,104,056 B2 | 1/2012 | Sofos et al. | |
| 8,161,506 B2 | 4/2012 | Sofos et al. | |

(Continued)

OTHER PUBLICATIONS

Non-Final Office Action for U.S. Appl. No. 12/413,993 received from the United States Patent and Trademark Office (USPTO) mailed Apr. 22, 2011, 18 pages.

(Continued)

*Primary Examiner* — Nasser Goodarzi
*Assistant Examiner* — Fred Peng
(74) *Attorney, Agent, or Firm* — Toler Law Group, PC

(57) ABSTRACT

Systems and methods to validate restriction event control streams sent to a video distribution system are provided. A particular method includes receiving a control stream and determining whether the control stream is valid based on a comparison of first restriction event information included in the control stream to second restriction event information stored in a mapping table.

20 Claims, 7 Drawing Sheets

(56) References Cited

U.S. PATENT DOCUMENTS

| | | | |
|---|---|---|---|
| 8,266,647 B2* | 9/2012 | Howcroft | 725/25 |
| 8,370,507 B1* | 2/2013 | Cain et al. | 709/229 |
| 2003/0169879 A1* | 9/2003 | Akins et al. | 380/241 |
| 2007/0199015 A1 | 8/2007 | Lopez et al. | |
| 2008/0092157 A1 | 4/2008 | Walter et al. | |
| 2008/0168487 A1 | 7/2008 | Chow et al. | |
| 2008/0256569 A1 | 10/2008 | Rhoades et al. | |
| 2009/0043794 A1* | 2/2009 | Rosenberg et al. | 707/101 |
| 2009/0064188 A1 | 3/2009 | Ospalik et al. | |
| 2009/0119696 A1 | 5/2009 | Chow et al. | |
| 2009/0187938 A1* | 7/2009 | de Heer et al. | 725/34 |
| 2009/0287749 A1* | 11/2009 | Yatabe et al. | 707/204 |
| 2010/0122280 A1 | 5/2010 | Sofos et al. | |
| 2010/0124399 A1 | 5/2010 | Sofos et al. | |
| 2010/0125865 A1 | 5/2010 | Ospalik et al. | |
| 2010/0125866 A1 | 5/2010 | Sofos et al. | |
| 2010/0125867 A1 | 5/2010 | Sofos et al. | |
| 2010/0251282 A1 | 9/2010 | Howcroft | |

OTHER PUBLICATIONS

Non-Final Office Action for U.S. Appl. No. 12/413,993 received from the United States Patent and Trademark Office (USPTO) mailed Oct. 26, 2011, 17 pages.

Notice of Allowance for U.S. Appl. No. 12/413,993 received from the United States Patent and Trademark Office (USPTO) mailed May 10, 2012, 18 pages.

* cited by examiner

| a | vn101 | vn102 | ... | vn119 | vn120 | | | | | | |
| b | vn151 | vn152 | ... | vn169 | vn170 | ... | vn179 | vn180 | ... | vn199 | vn200 |
| c | vn121 | vn122 | ... | vn139 | vn140 | | vn149 | vn150 | | | |
| d | vn201 | vn202 | ... | vn219 | vn220 | | | | | | |

SYSTEM AND METHOD TO VALIDATE RESTRICTION EVENT CONTROL STREAMS SENT TO A VIDEO DISTRIBUTION SYSTEM

CLAIM OF PRIORITY

This application is a continuation of and claims priority from U.S. patent application Ser. No. 12/413,993, filed on Mar. 30, 2009 and entitled "SYSTEM AND METHOD TO VALIDATE RESTRICTION EVENT CONTROL STREAMS SENT TO A VIDEO DISTRIBUTION SYSTEM", the contents of which are expressly incorporated herein by reference.

FIELD OF THE DISCLOSURE

The present disclosure is generally related to validating restriction event control streams sent to a video distribution system.

BACKGROUND

Media service providers, such as television service providers, acquire content from content providers, such as television networks, and distribute the content to subscribers. Some content is subject to restriction events, such as blackouts. Restriction events may be scheduled manually by personnel of media service providers, personnel of the video distribution system, or both. Manually scheduling restriction events may be labor intensive and prone to error.

DETAILED DESCRIPTION

Figure 1:
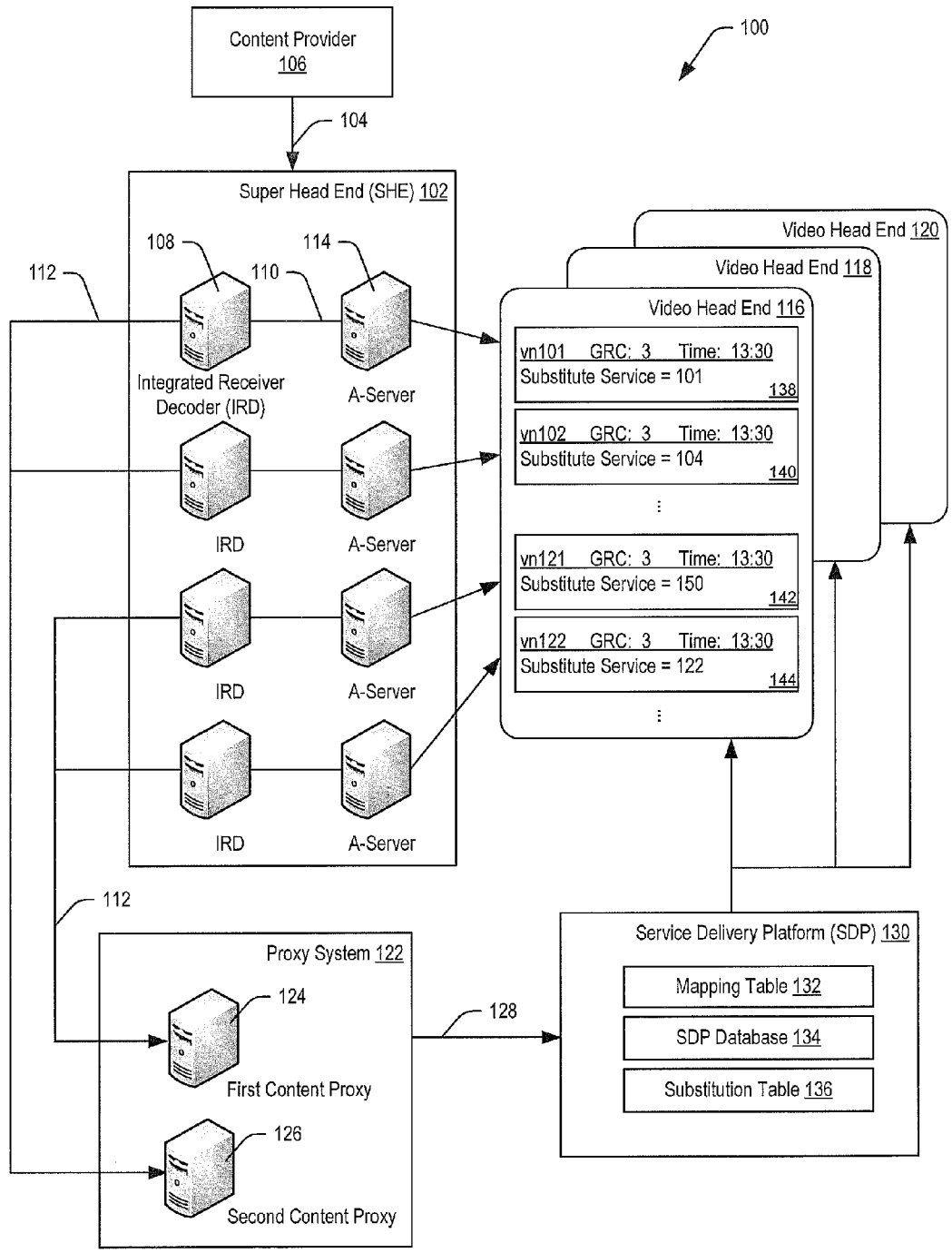
FIG. 1 is a block diagram of a first particular embodiment of a system to validate restriction event control streams sent to a video distribution system.

Systems and methods to validate restriction event control streams sent to a video distribution system are provided. A particular method includes receiving a control stream from a content provider via a content proxy device. The control stream is associated with a restriction event and directs a media service delivery platform to associate a particular media service with a virtual network for at least one geographical region. The method also includes evaluating validity of the control stream based on content proxy information associated with the content proxy device.

A particular system includes at least one user interface viewable on a display device. The at least one user interface is configured to enable entry of data to generate a content proxy to virtual network mapping table. The system also includes a media service delivery platform. The media service delivery platform includes a computer-readable storage medium and a processor to receive control streams and to access the content proxy to virtual network mapping table to validate the control streams. At least one control stream is associated with a restriction event. The at least one control stream includes restriction event instructions. The at least one control stream also includes a content proxy identifier of a content proxy that received the control stream from a content provider.

In a particular embodiment, a computer-readable storage medium includes operational instructions that, when executed by a processor, cause the processor to receive a control stream associated with a restriction event. The computer-readable storage medium also includes operational instructions that, when executed by the processor, cause the processor to compare content proxy information and virtual network information of the control stream with a content proxy and virtual network mapping table to determine validity of the control stream. The computer-readable storage medium further includes operational instructions that, when executed by the processor, cause the processor to generate a substitution table when the control stream is identified as valid.

Content providers (e.g., television networks) may provide media content to viewers through a variety of media distribution systems. For example, media content of a content provider may be distributed via broadcast systems, Internet Protocol Television (IPTV) systems, cable access television (CATV) systems, or other media distribution systems. Certain media content provided by a content provider may be intended for limited distribution or may otherwise be restricted so that certain viewers are not allowed to receive the media content. For example, certain sporting events may be blacked out in various geographic regions to encourage people near the event to see the event live. The content provider, the media distribution system provider, or both may be required by contract to restrict viewer access to such restricted media content. One method used to restrict access to media content is to provide alternate or substitute media content instead of the restricted media content. To provide substitute content, among other reasons, content providers may provide more than one stream of media content (also referred to herein as a "service") to the media distribution systems for distribution. Thus, when a first service is subject to a restriction event (e.g., the media content is not allowed to be distributed to certain viewers in a particular geographic region), a second service may be provided to viewers in the restriction event area.

To accommodate restriction events, a media distribution system may map the services provided by a content provider to various channels accessible by viewers. The media distribution system may be large and may include many geographic regions. Several restriction events may start, may be ongoing, or may end at any given time. Coordinating, scheduling, implementing and verifying the restriction events may be complex process.

A particular content provider may provide a large number of services to the media distribution system. One or more of the services may be subject to a restriction event. Each restriction event may specify that a particular substitute service to be provided to viewers within a certain geographic region of the media distribution system while a "normal" service is provided to other viewers of the media distribution system. The content provider may determine what service is "normal". For example, the content provider may provide Service 1, Service 2, and Service 3 (e.g., ESPN, ESPN2, and ESPN alternate) along with other services to the media distribution system. To make it easier for viewers to find particular content, the media distribution system may establish channels that are associated with the content provider. For example, the video distribution system may associated channel 201 with Service 1 and channel 202 with Service 2. When there is no restriction event, Service 1 may be viewed on channel 201 and Service 2 may be viewed on channel 202. When a restriction event occurs in a particular geographic region, Service 3 may be mapped to channel 201 as a substitute for Service 1.

In a particular embodiment, the media distribution system may accommodate such remapping of services provided by the content provider to channels accessible by a viewer by the use of virtual networks. A virtual network and a geographic identifier may together specify a channel accessible by a viewer. Thus, when a restriction event for a particular geographic region occurs, a service may be mapped to a channel by specifying to which virtual network and geographic region the service is to be sent.

Content providers may provide restriction event control streams to the media distribution system that allow the media distribution system to implement restriction events. To reduce redundant entry of restriction events, to reduce the time needed to implement a restriction event, to ensure that required restriction events are implemented or for other reasons, the media distribution system may verify the validity of received restriction event control streams.

A restriction event control stream may include data needed to implement a restriction event. For example, the restriction event control stream may indicate services to be associated with various virtual networks in geographic regions. The restriction event control stream may also include time information to indicate when the restriction event is to be implemented. The restriction event control stream may implement a retune event. A retune event indicates that a restriction event has ended so remapping of services to channels that occurred to implement the restriction event should be undone. For example, the retune event may indicate that a "normal" service should be provided via a particular virtual network in a specified geographic region. Additionally, the restriction event control stream may include or be associated with information that can be used to validate a control message of the control stream.

Referring to FIG. 1, a block diagram of a particular embodiment of a system to validate restriction event control streams sent to a video distribution system is illustrated and designated generally 100. The system 100 may include Super Head End (SHE) 102, content provider 106, Video Head Ends (VHEs) 116-120, proxy system 122, and Service Delivery Platform (SDP) 130. The system 100 may enable the content provider 106 to schedule and execute restriction events with little or no input from operators of the video distribution system (e.g., an Internet Protocol Television (IPTV) network or a cable access television (CATV) network). The system 100 may include at least a portion of the video distribution system.

The SHE 102 may receive a stream 104 from a content provider 106. A control stream in the stream 104 may include information pertaining to particular media content that is to be sent to a user of the video distribution system when the user selects a particular channel in a particular geographic region during a period of time. For example, the control stream may specify a virtual network and a geographic region to which a particular service is to be provided. The content provider 106 may change control streams in the stream 104 to implement restriction events without the need to inform personnel of the video distribution system of the restriction events.

The SHE 102 may include a plurality of integrated receiver-decoders (IRDs) 108. Each IRD 108 may receive a portion of the stream 104 provided by the content provider 106. Each portion of the stream 104 may include media content 110, a restriction event control stream 112, or both. The restriction event control stream 112 may specify one or more particular restriction events. When the portion of the stream 104 received by a particular IRD 108 includes both the media content 110 and the restriction event control stream 112, the IRD 108 that receives the portion of the stream 104 separates it into a stream that includes the media content 110 and the restriction event control stream 112. The restriction event control stream 112 may include, but is not limited to, a virtual network identifier, a service identifier, and a time when the restriction event control stream 112 becomes valid. The virtual network identifier specifies a particular virtual network. The virtual network may be a designation used by the video distribution system that is associated with a channel accessible to viewers in a particular geographic location. That is, a combination of the virtual network and the geographic region corresponds to a channel that a user can tune a set-top box device or other media receiver to in order to receive a service or to a use for the service (e.g., use of the service as a picture-in-picture stream or use of the service as a substitute service). The service may include a multimedia stream or a still image. The service identifier in the restriction event control stream 112 may correspond to a particular service of a set of services provided by the content provider 106. Other control streams identified by a particular IRD 108 may remain with the media content 110.

In a particular embodiment, when the service identifier in the restriction event control stream 112 is the same as the virtual network identifier, normal service may be provided. When the service identifier is different than the virtual network identifier, substitute service may be provided. For example, in a particular embodiment, the stream 104 provided by the content provider 106 includes media content of a first sporting event via a first service and media content of a second sporting event via a second service. The first service may be associated with the virtual network "SPORTchannel" and the service identifier "SPORTchannel". The second service may be associated with the virtual network "SPORTchannel_alt" and the service identifier "SPORTchannel_alt". In a particular geographic area, the virtual network "SPORTchannel" may be obtained when a viewer tunes to channel 231. In other geographic areas, different virtual networks may be mapped to channel 231. When no restriction event is in place (i.e., when "normal" service is provided), a viewer tuned to channel 231 in the particular geographic area receives the "SPORTchannel" service. However, when a restriction event is in place that requires the use of the second service instead of the first service, the viewer tuned to channel 231 receives the "SPORTchannel_alt" service. When the restriction event ends, the content provider may send a retune stream via the restriction event control stream 112. The retune stream may return the video distribution system to normal service For example, in the particular geographic area where the virtual network "SPORTchannel" corresponds to channel 231, the "SPORTchannel" service is provided for channel 231 when the retune stream is implemented.

The media content 110 from a particular IRD 108 may be sent to an acquisition server (A-server) 114. Each acquisition server 114 may include an encoder that encodes the media content 110 for distribution. The encoded media content 110 may be sent from the A-servers 114 to VHEs 116-120. Each of the VHEs 116-120 may distribute the media content 110 to client devices (e.g., to set-top box devices or other media devices) within a particular geographical area of the video distribution system.

When a particular IRD determines that the restriction event control stream 112 includes data pertaining to a restriction event, the particular IRD sends the restriction event control stream 112 to a content proxy, such as first content proxy 124 or second content proxy 126, of a proxy system 122. Each of the content proxies 124, 126 of the proxy system 122 is associated with a particular set of IRDs 108. The content proxies 124, 126 may change the formatting or other aspects of the received restriction event control stream 112 to prepare the restriction event control stream 112 to be sent to a service delivery platform (SDP) 130 of the video distribution system. The content proxies 124, 126 may also add a content proxy identifier associated with the particular content proxy that received the restriction event control stream 112. The content proxies 124, 126 output a control stream 128 that is sent from the proxy system 122 to the SDP 130.

The SDP 130 may parse the control stream 128 to prepare information used by the video distribution system to implement restriction events. For example, the SDP 130 may parse the control stream 128 into various data elements. The data elements may include, but are not limited to, the content proxy identifier of the particular content proxy that forwarded the control stream 128, a virtual network identifier, a time, one or more geographical region codes (GRCs), and an identifier of a service provided by the content provider 106. The time may indicate when the service is to be distributed via the virtual network at the one or more geographical regions. When a restriction event is over, a retune stream may be received from the content provider 106. The retune stream may indicate that a normal service distributed via the virtual network is provided within the one or more geographic regions. The GRCs may represent regions where set-top box devices are located. Each STB device of the video distribution system may be associated with a single GRC that identifies the location of the STB device. GRCs may be based on zip codes or other regional identifiers.

Before implementing a restriction event, the SDP 130 may check the validity of a received control stream 128. For example, the SDP 130 may confirm that the content proxy identifier in the control stream 128 is found in a content proxy to virtual network mapping table 132 and that the virtual network identifier of the control stream 128 is associated with the content proxy identifier in the mapping table 132.

In a particular embodiment, the mapping table 132 associates virtual networks with content proxies through which valid control streams 128 can be received. The virtual networks may be designated in groups or blocks in the mapping table 132. For example, each of the IRDs 108 may be associated with one or more services of the content provider 106. Additionally, each service may be associated with one or more blocks of virtual networks of the video distribution system. Since each of the content proxies 124, 126 is associated with one or more of the IRDs 108, a valid control stream for a particular service may be received by a particular IRD 108 and processed by a particular content proxy 124, 126. To illustrate, virtual networks vn101-vn120 may be mapped to the first content proxy 124 in the mapping table 132 and virtual networks vn121-vn150 may be mapped to the second content proxy 126 in the mapping table 132. When the SDP 130 receives a first control stream (via the control stream 128) from the proxy system 122, the SDP 130 may determine a content proxy identifier of the particular content proxy 124, 126 that sent the first control stream and the virtual network identifier of the first control stream. The first control stream is valid when the content proxy identifier and the virtual network identifier are associated in the mapping table 132. Thus, when the content proxy identifier is of the first content proxy 124 and the virtual network identifier is of a virtual network vn102, the first control stream is valid because virtual network vn102 is within the block of virtual networks associated with the first content proxy 124. The first control stream is not valid when the content proxy identifier and the virtual network identifier are not associated in the mapping table 132. Thus, when the content proxy identifier is of the first content proxy 124 and the virtual network identifier is of a virtual network vn190, the first control stream is not valid because virtual network vn190 is not within the block of virtual networks associated with the first content proxy 124.

Valid control streams may be logged in a SDP database 134. The valid control streams may be used to update a substitution table 136. Invalid control streams may be logged in the SDP database 134. An invalid control stream may result in an alarm that informs an operator of the system 100 of the receipt of an invalid control stream. Representatives of the content provider 106 may have access to valid control stream information and invalid control stream information in the SDP database 134.

The substitution table 136 may include information that determines what media service will be sent to a set-top box device in a geographical region when a user of the set-top box tunes to a particular channel at a particular time. The substitution table 136 may be an array stored in a computer memory. In a particular embodiment, columns of the substitution table 136 correspond to virtual networks of the video distribution system, and rows of the substitution table 136 correspond to geographical regions as defined by GRCs. The content of an entry in the substitution table 136 may include an identifier of a service to be provided via the virtual network.

In a particular embodiment, an entry in the substitution table 136 may include an identifier of a particular service when normal service is provided. In other particular embodiments, a constant or null value entry in the substitution table 136 may indicate that normal service is to be provided. An entry other than the particular service, the constant, or the null value may indicate that substitute service will be provided.

In a particular embodiment, the substitution table 136 is sent to each VIM 116-120. In another particular embodiment, only a portion of the substitution table 136 that corresponds to geographical regions serviced by a particular VHE 116-120 is sent to the particular VHE 116-120. The SDP 130 may communicate with each of the VHEs 116-120 to determine the GRCs serviced by each of the VHEs 116-120. Each substitution table 136 or portion of the substitution table 136, sent to the VHEs 116-120 may be associated with a particular identifier, time, or both.

Each VHE 116-120 receives the substitution table 136 or a portion of the substitution table 136 associated with a particular identifier, time or both from the SDP 130. For example, as illustrated in FIG. 1, the VHE 116 receives entries 138-144 of the substitution table 136 that correspond to GRC 3 for the time 13:30. Entry 138 may indicate that the media content associated with service 101 should be provided while a user in the geographic region associated with GRC 3 is tuned to a channel corresponding to virtual network vn101. Entry 140 may indicate that the media content associated with service 104 should be provided while a user in the geographic region associated with GRC 3 is tuned to a channel corresponding to virtual network vn102. Entry 142 may indicate that the media content associated with service 150 should be provided while a user in the geographic region associated with GRC 3 is tuned to a channel corresponding to virtual network vn121. Entry 144 may indicate that the media content associated with service 122 should be provided while a user in the geographic region associated with GRC 3 is tuned to a channel corresponding to virtual network vn122.

Each of the VHEs 116-120 may create access tables for the GRCs serviced by the VHEs 116-120 based upon the substitution table 136. The VHEs 116-120 may send the access tables to media access devices (e.g., set-top box devices) in the regions serviced by the VHEs 116-120 so that the access tables are received by the media access devices of the video distribution system. Each media access device may be associated with a single GRC. In a particular embodiment, the access tables received by the media access devices include multicast group addresses for each channel accessible by the media access devices.

Figure 2:
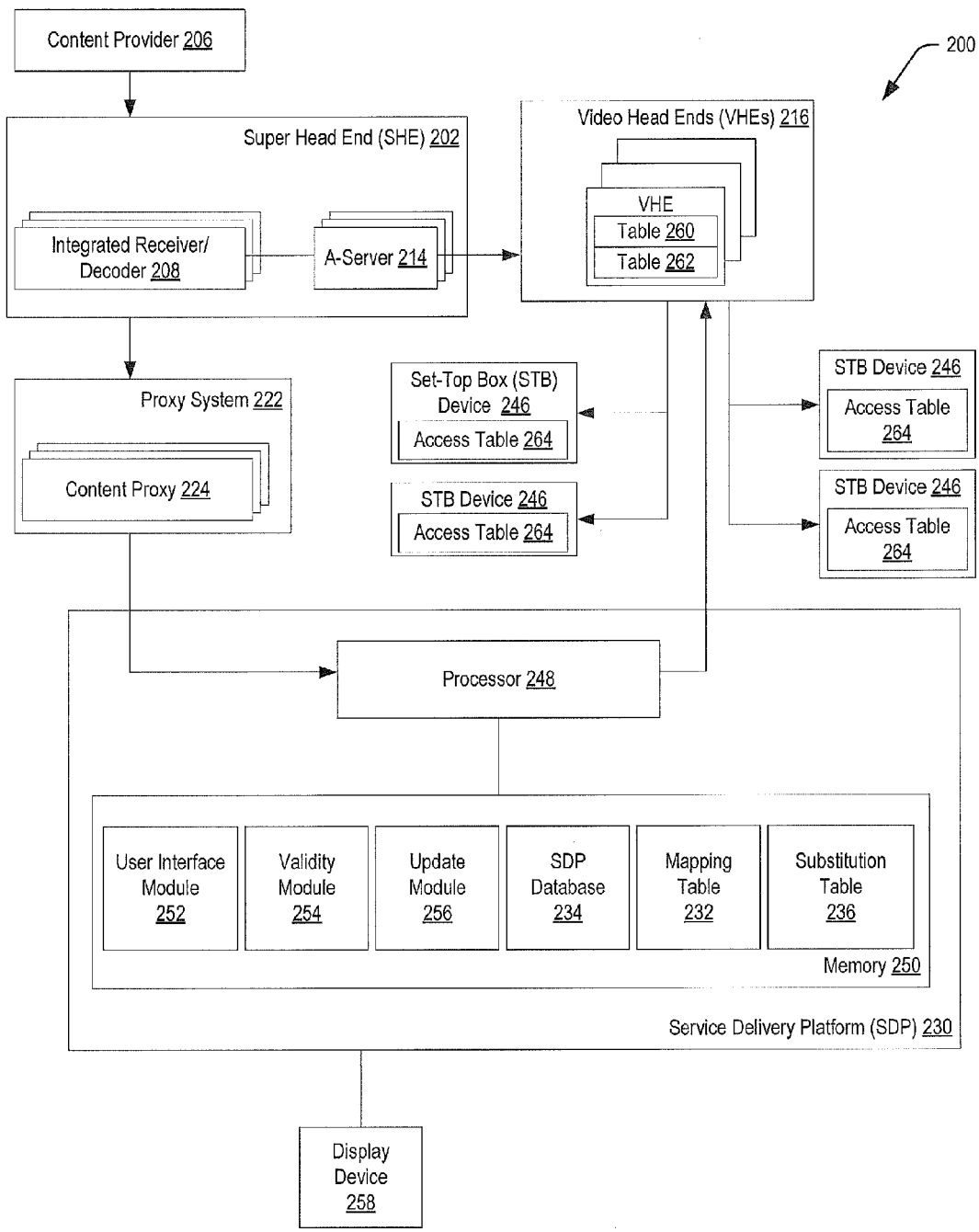
FIG. 2 is a block diagram of a second particular embodiment of a system to validate restriction event control streams sent to a video distribution system.

Referring to FIG. 2, a block diagram of a second particular embodiment of a system to validate restriction event control streams sent to a video distribution system is illustrated and designated generally 200. The system includes a service delivery platform (SDP) 230 that communicates with a super head end (SHE) 202 via a proxy system 222. Alternatively, the proxy system 222 can be integrated with the SDP 230. The SHE 202 communicates with at least one content provider 206. Further, the SDP 202 communicates with a plurality of video head ends (VHEs) 216. Each of the VHEs 216 provides media content that may be received by client devices such as set-top box (STB) devices 246 of a video distribution system.

In a particular embodiment, the content provider 206 provides media content to the SHE 202 for distribution via a plurality of services. Certain items of the media content may be subject to a restriction event. For example, a restriction event occurs when a first service provided by the content provider 206 is available in a first geographic region but is unavailable in a second geographic region. A second service provided by the content provider 206 that is different than the first service may be made available as a substitute for the first service. To illustrate, the first service may normally (i.e., when no restriction event is in place) be provided via a channel corresponding to a first virtual network in the first geographic region and in the second geographic region. When a restriction event is in place, the second service may be provided via the first virtual network in the first geographic region while the first service continues to be provided via the first virtual network in the second geographic region. A particular channel may be associated with each virtual network within each geographic region. The services shown on the channels corresponding to the virtual network in different regions serviced by the video distribution system may be different due to anticipated interest, legal obligations or both. For example, a restriction event may occur with respect to a particular virtual network as a result of a particular sporting event being blacked out due to contractual obligations of the content provider, the video distribution system provider, or both.

In one embodiment, the content provider 206 sends a media content stream to the SHE 202. When the content provider 206 determines that the media content is subject to a restriction event, the content provider 206 can also send a control stream to the SHE 202. The control stream may include parsable control data indicating at least one geographical area or subscriber group for which access to a particular service of the content provider 206 is to be restricted and also identifies a substitute service.

The SHE 202 may include a plurality of integrated receiver-decoders (IRDs) 208. Each IRD 208 may be coupled to one of a plurality of acquisition servers (A-servers) 214. In a particular embodiment, each IRD 208 may receive a media content stream associated with a service of the content provider 206. Each IRD 208 may deliver corresponding media content to client devices via the video distribution system. In an illustrative embodiment, the media content stream is a Moving Picture Experts Group (MPEG) stream or a Joint Photographic Experts Group (JPEG) image. Each IRD 208 sends media content associated with a received media content stream to an A-server 214 to which it is coupled. Each A-server 214 may distribute the media content to one or more of the VHEs 216 for delivery to client devices in various geographical regions served by the VHEs 216.

Further, each IRD 208 may receive a control stream related to delivery of media content. Each IRD 208 may determine whether the control stream includes data indicating that a service of the content provider 206 or particular media content associated with the service is subject to one or more restriction events (e.g., a blackout, a limitation on access to users associated with a particular subscription level, a limitation on access to users who pay for media content corresponding to the media content stream, or a combination thereof). The IRD 208 may send the control stream to the SDP 230 via the proxy system 222 when the control stream includes data indicating that the service is subject to one or more restriction events.

The SDP 230 may include a processor 248 and a memory 250 accessible to the processor 248. The memory 250 may include, but is not limited to, an SDP database 234, a content proxy to virtual network mapping table ("mapping table") 232, a substitution table 236, and modules 252-256. The SDP database 234 may be used to log control streams received from the proxy system 222. In some embodiments, the SDP database 234 is external to the SDP 230. For example, the SDP database 234 may be a portion of a memory of a server of the content provider 206. The mapping table 232 may be used to determine the validity of each control stream received from the proxy system 222. The substitution table 236 may be used to determine what service is to be associated with a virtual network of the video distribution service for each geographical region. The modules 252-256 may include data stores, hardware logic, instructions executable by the processor 248 (e.g., instructions included in one or more computer programs or operating systems) or any combination thereof. The modules 252-256 may provide various functions to automatically provide a substitute service to selected regions during restriction events. The substitute service may be a still image or alternate media content.

The memory 250 may include a user interface module 252 that is executable by the processor 248. The user interface module 252 may enable the SDP 230 to receive user input entered through a keyboard, mouse, touch screen, other input device or combinations thereof. The user interface module 252 may output data, alarms, alerts, other information, and combinations thereof to display devices, such as a display device 258 or other devices coupled to the SDP 230 (e.g., a computing device associated with the content provider 206). An operator of the SDP 230 may use the user interface module 252 to initiate or terminate a restriction event, monitor ongoing automated processes, manually override automated processes, fix problems that may have occurred in the automated processes, or combinations thereof.

The memory 250 may include a validity module 254 that is executable by the processor 248. The validity module 254 may receive control streams from the proxy system 222. The validity module 254 may parse the control streams into data elements. The validity module 254 may compare a proxy identifier data element and a virtual network identifier data element from each control stream to the mapping table 232 to determine whether each control stream is valid. A control stream is valid when the proxy identifier data element of a control stream corresponds to a content proxy identifier in the mapping table 232 and when the virtual network identifier data element of the control stream is associated with the content proxy identifier in the mapping table 232. When the control stream is invalid, the validity module 254 may log the invalid stream in the SDP database 234. The log entry may include data indicating that the control stream was invalid, data indicating the virtual network associated with the invalid control stream, a time the invalid control stream was received, a geographical region code (GRC) or GRCs associated with the invalid control stream, a substitute service associated with the invalid control stream, other information descriptive of the invalid control stream, or any combination thereof. When the control stream is invalid, the validity module 254 may call the user interface module 252 to send an alarm to the display device 258. The alarm may be a visual alarm, an audio alarm or both. The user interface module 252 may also send an alarm to the content provider 206 notifying the content provider 206 of the receipt of an invalid control stream.

When the control stream is valid, the validity module 254 may log the valid stream in the SDP database 234. The log entry may include data indicating that the control stream was valid, data indicating the virtual network associated with the valid control stream, a time the valid control stream was received, a GRC or GRCs associated with the valid control stream, a substitute service associated with the valid control stream, other information descriptive of the valid control stream, or any combination thereof.

The memory 250 may include an update module 256 that is executable by the processor 248. The update module 256 may receive data elements of valid control streams from the validity module 254. A time data element of each control stream may be examined to determine whether a current substitution table 236 should be updated to include information from the control stream. When the time data element indicates that a restriction event is to be implemented at a future time, the update module 256 may store the data elements of the control stream in the memory 250 and accesses the data elements to update the substitution table 236 when the time for using the data elements is appropriate.

The update module 256 may update the substitution table 236 using data elements from the valid control streams when the time data element is appropriate for the current substitution table 236. The substitution table 236 may include an array having columns and rows. The columns of the substitution table 236 may correspond to virtual networks that the set-top box devices 246 may access when the set-top box devices 246 tune to a particular channel. The rows of the array may correspond to GRCs. Each entry in the substitution table 236 is an identifier of a service provided by the content provider 206.

The update module 256 may enter an identifier of a substitute service into an entry of the substitute table 236 to implement a restriction event in response to a control stream. For example, one or more entries corresponding to the GRC data element from the control stream and the virtual network data element of the control stream may be updated to include the identifier of the substitute service.

When the substitute table 236 is updated, the processor 248 may send data to the VHEs 216. The data may include a time when the data is valid and at least a portion of the substitute table 236.

Each of the VHEs 216 may receive a table 260 from the SDP 230. Alternately, each of the VHEs 216 may create the table 260 using a portion of the substitute table 236 received from the SDP 230. Rows of the table 260 may correspond to GRCs serviced by the VIM. Columns of the table 260 may correspond to virtual networks. An entry in the table 260 may identify a service of the content provider 206 to be provided via the virtual network. Each of the VHEs 216 may also include a table 262 that is a prior version of the table 260. Alternately, the table 262 may include information indicating normal service to be provided via each virtual network.

In a particular embodiment, each of the VHEs 216 compares table 260 to table 262. When a particular VHE 216 does not detect a difference in any entry of the table 260 as compared to the table 262, the particular \THE 216 may wait to receive new data from the SDP 230. When the particular VHE 216 detects a difference in the table 260 as compared to the table 262, the particular VHE 216 may creates an access table 264.

In a particular embodiment, the access table 264 may includes a first row having an identifier for each virtual network corresponding to a column of table 260 and a second row having an identifier of the corresponding entry from table 260 (e.g., a service to be provided for the virtual network corresponding to an entry of the first row). Some identifier in the first row may be channel numbers that the STB devices 246 tune to in order to receive the services for the virtual networks. Other identifiers in the first row may correspond to virtual networks not associated with particular channels (e.g., picture-in-picture streams or alternate services for the particular channels). The identifiers in the second row may correspond to multicast group addresses for the services (i.e., the substitute service or the normal service) to be provided for the corresponding identifiers of the first row. In a particular embodiment, the access table 264 is sent from each of the VHEs 216 to the STB devices 246 in a region serviced by the VHE. In another particular embodiment, the access table 264 is sent from each of the VHEs 216 only to the STB devices 246 that are affected by the restriction event. For example, the access table 264 may be sent only to STB devices 246 associated with the GRC corresponding to the row of the table 260 in which a difference was detected. The data may include the GRC corresponding to the row of the table 260 in which a difference was detected, a time when the control stream becomes valid, and the access table.

A STB device 246 may receive the access table 264 from one of the VHE 216 that services the region where the STB device 246 is located. The STB device 246 may also receive other data associated with the access table, such as a GRC and a time when the access table 264 will becomes valid. A STB device 246 may ignore an access table 264 that does not correspond to a GRC associated with the STB device 246. Each access table 264 may include information to map channels accessible by the STB devices 246 to virtual networks of the video distribution system. For example, the access table 264 may include a first row and a second row. An entry in the first row may be a virtual network identifier. An entry in the second row may be a multicast group address corresponding to a virtual network. The multicast group address may indicate where to access the service associated with the corresponding virtual network. When the access table is valid (e.g., based on the time current time and the time that the access table 264 will become valid) the STB devices 246 may use the access table 264 to retrieve the appropriate service when the STB device 246 is tuned to a particular channel.

Figures 3, 4:
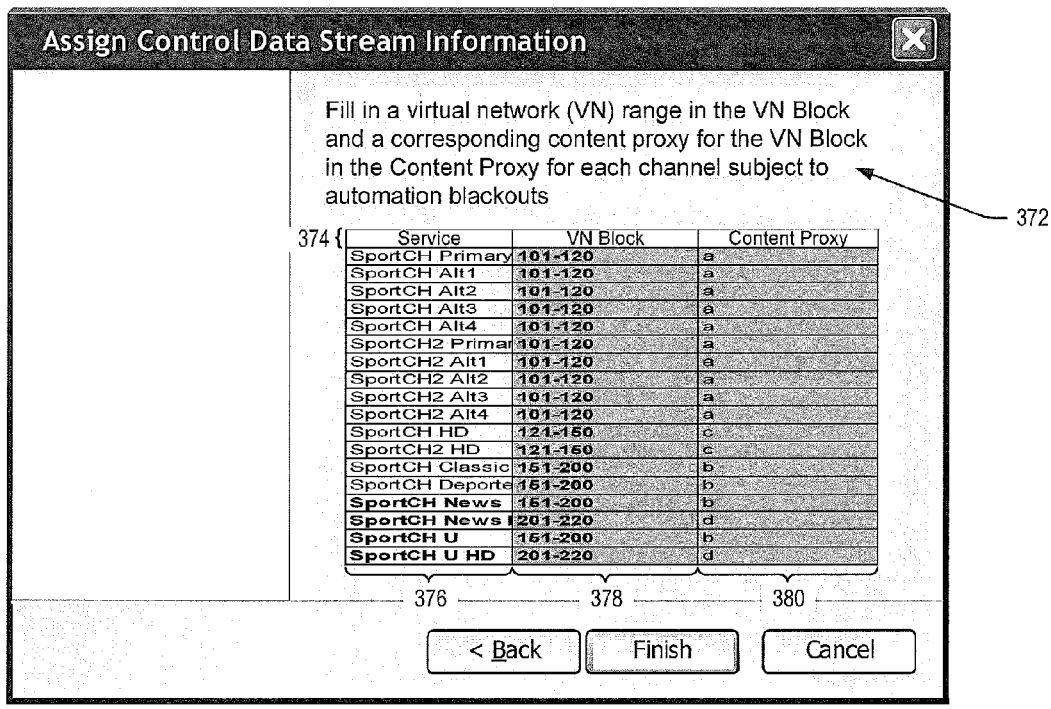
FIG. 3 is a particular embodiment of a graphical user interface that may be used in a system to validate restriction event control streams sent to a video distribution system.
FIG. 4 is a particular embodiment of a content proxy to virtual network mapping table usable by a system to validate restriction event control streams sent to a video distribution system.

Referring to FIG. 3, a particular embodiment of a user interface that may be used in a system to validate restriction event control streams sent to a video distribution system is illustrated and generally designated 370. The user interface 370 may include instructions 372, a title block 374, a service column 376, a virtual network (VN) block column 378 and a content proxy column 380. The instructions 372 may inform a representative of a content provider or a media service provider to provide a virtual network range and a corresponding content proxy for each service that a content provider provides to a video distribution system (e.g., an IPTV network). The title block 374 may inform a user of the information included in each column. The title block 374 may not be changed by the user.

Services listed in the service column 376 may correspond to media content streams that the content provider sends to the video distribution system. In a particular embodiment, the titles in the service column 376 cannot be changed using the user interface 370. A virtual network range entered in the VN block column 378 corresponding to a particular title in the service column 376 indicates that the set of virtual network identifiers in the virtual network range can be used to distribute the corresponding service. A content proxy entered in the content proxy column 380 corresponding to a particular service in the service column 376 indicates that valid control streams pertaining to blackout events for the service may be received via the content proxy. For example, the content proxy "a" identified in the first ten rows of content proxy column 380 may correspond to the first content proxy 224 of the proxy system 222 of FIG. 2.

Referring to FIG. 4, a particular embodiment of a content proxy to virtual network mapping table usable by a system to validate restriction event control streams sent to a video distribution system is illustrated and generally designated 432. Entries in a first column of the mapping table 432 may include identifiers of content proxies of a proxy system. Entries in the remaining columns of the mapping table 432 may correspond to virtual networks associated with the content proxies. Data used to populate the mapping table 432 may be obtained from a user interface, such as the user interface 370 of FIG. 3. For example, data for the first column of the mapping table 432 may correspond to each unique content proxy entered in the proxy column 380 of the user interface 370 depicted in FIG. 3. Also, the values for the remaining entries in the mapping table 432 may be obtained from data entered in the VN block column 378 of the user interface 370 depicted in FIG. 3.

Figure 5:
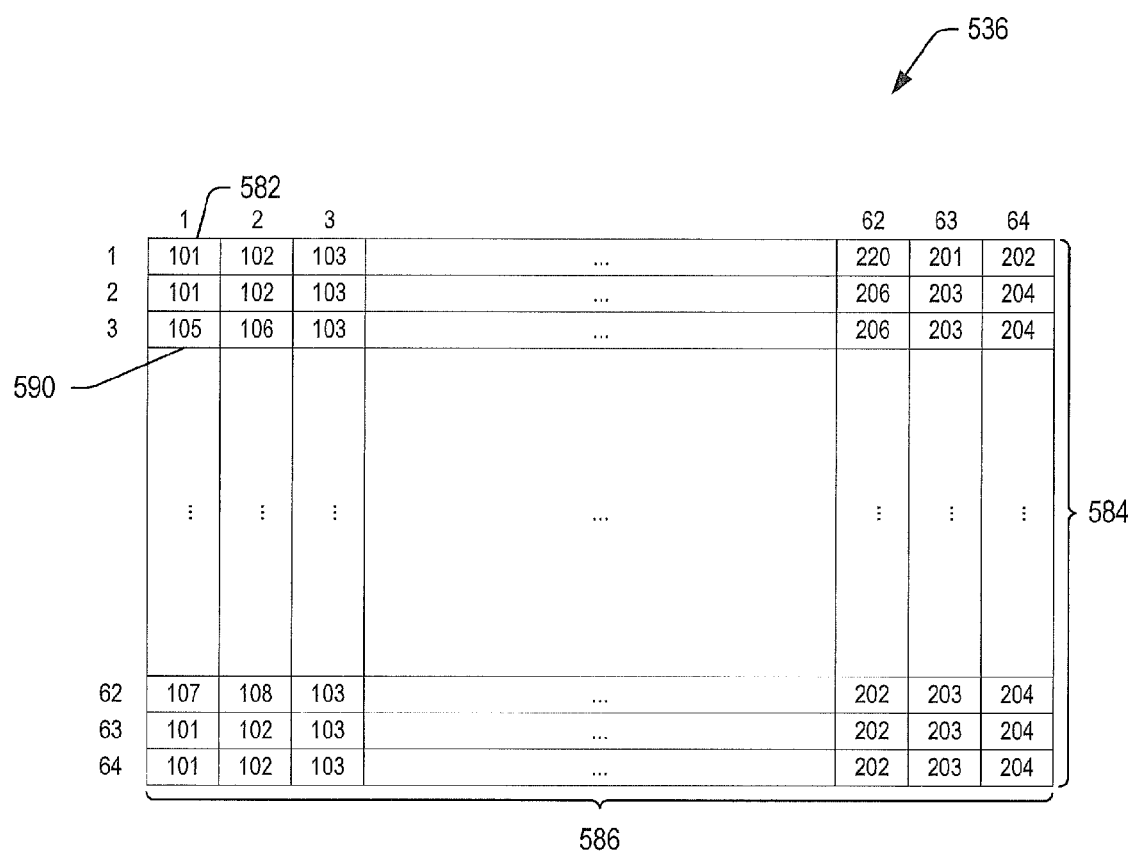
FIG. 5 is a particular embodiment of a substitution table for use in a system to validate restriction event control streams sent to a video distribution system.

Referring to FIG. 5, a particular embodiment of a substitute table for use in a method or system to validate restriction event control streams sent to a video distribution system is illustrated and generally designated 536. The substitute table 536 includes multiple entries 582 arranged into rows 584 and columns 586. The substitute table 536 depicted in FIG. 5 has 64 rows 584 and 64 columns 586. In other embodiments, the substitute table 536 may have a different number of rows 584, a different number of columns 586, or both.

Each entry in the substitute table 536 may contain an identifier of a service provided by a content provider. Each row 584 may correspond to a unique geographical region code (GRC) associated with a geographic region service by a video distribution system. For example, row 1 may correspond to a GRC 1, row 2 may correspond to a GRC 2, and so on. Each column 586 may correspond to a virtual network used by the video distribution system to distribute media content. Within a particular geographic region, each virtual network may be associated with a particular channel. For example, column 1 may correspond to a virtual network vn101, column 2 may correspond to a virtual network vn102, column 3 may correspond to a virtual network vn103, column 62 may correspond to a virtual network vn202, column 63 may correspond to a virtual network vn203 and column 64 may correspond to a virtual network vn204.

When the service identifier in an entry for a particular row and column corresponds to an identifier of the virtual network associated with the particular column, the substitute table 536 indicates that a normal service is to be provided via the channel associated with the virtual network. When the service identifier in the entry for the particular row and column does not correspond to the identifier of the virtual network, the substitute table 536 indicates that substitute service is to be provided via the channel associated with the virtual network. For example, as discussed above, row 1 may correspond to GRC 1 and column 1 may correspond to virtual network vn101. A first table entry 582 associated with row 1 and column 1 includes the service identifier 101. The service identifier 101 corresponds to the virtual network vn101 (as indicated by digits of the identifiers matching). Accordingly, the first entry 582 indicates that within the geographic region associated with GRC 1, the service identified by service identifier 101 is to be provided via the virtual network vn101. This is "normal" service since the service identifier 101 and the virtual network identifier 101 correspond. However, in another example, row 3 may correspond to GRC 3 and column 1 may corresponds to vn101. A second entry 590 at row 3 and column 1 indicates that substitute service is to be provided on the channel associated with virtual network vn101 within the geographic region associated with GRC 3. The substitute service is indicated by service identifier 105, which does not correspond with virtual network vn101 (as indicated by the digits of the identifiers not matching). When at least one entry of the substitution table 536 indicates that substitute service is to be provided, one or more access tables may be generated. The access tables may be distributed to media access devices with affected geographic regions to causes the substitute services to be received by the media access devices.

The substitution table 536 is represented in FIG. 5 as a two-dimensional array of rows and columns. When the substitution table 536, or a portion of the substitution table is to be sent from one device to another device (e.g., from the SDP 130 to the VHE 116 depicted in FIG. 1), the substitution table may be converted to a one-dimensional array (e.g., a delimited data file) or other data format.

Figure 6:
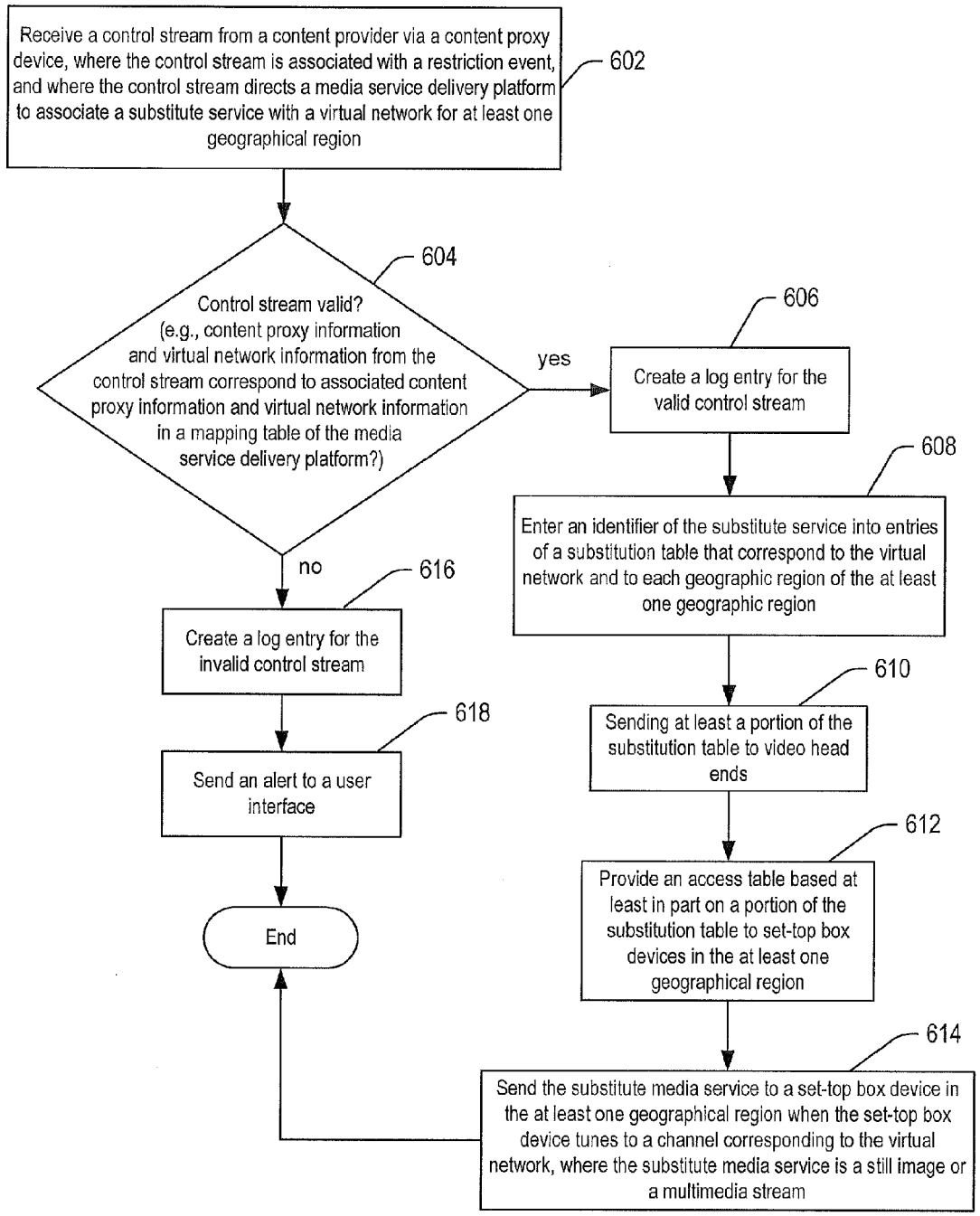
FIG. 6 is a flow diagram of a particular embodiment of a method to validate restriction event control streams sent to a video distribution system.

Referring to FIG. 6, a first particular embodiment of a method to validate restriction event control streams sent to a video distribution system is illustrated. The method may include, at 602, receiving a control stream from a content provider via a content proxy device. The control stream may be associated with a restriction event (such as a blackout event). The control stream may direct a media service delivery platform to associate a substitute service with a virtual network for at least one geographical region.

At 604, a determination may be made regarding whether the control stream is valid. In a particular embodiment, the control stream is identified as valid when content proxy information identifying the content proxy and virtual network information from the control stream correspond to associated content proxy information and virtual network information in a content proxy to virtual network mapping table. In the content proxy to virtual network mapping table, identifiers of virtual networks of the media service delivery platform are associated with identifiers of content proxies that forward control streams to the media service delivery platform. When the control stream is identified as valid, the method may proceed at 606. When the control stream is invalid, the method may proceed at 616.

For a valid control stream, a log entry for the valid control stream is created at 606. The log entry may be made in a database. At 608, an identifier of the substitute service may be entered into each portion of a substitution table that corresponds to each geographic region of the at least one geographic region and to the virtual network.

At 610, at least a portion of the substitution table may be provided to video head ends. In a particular embodiment, the entire substitution table is provided to each video head end. In another particular embodiment, only a portion of the substitution table that pertains to geographical regions serviced by a video head end is sent to the video head end.

At 612, an access table based at least in part on a portion of the substitution table is provided to set-top box devices in the at least one geographic region. At 614, the substitute service may be sent to a set-top box device in the at least one geographical region when the set-top box device tunes to a channel corresponding to the virtual network. The substitute service may be a still image or a multimedia stream. After the substitute service is sent to the set-top box device, the method ends.

For an invalid control stream, a log entry for the invalid control stream is created, at 616. The log entry may be made in the same database where valid control streams are logged or in a different database. At 618, an alert may be sent to a user interface. The alert may be a visual alert, an audible alert, or both. In a particular embodiment, the user interface may be displayed on a display device coupled to the media service delivery platform. In a particular embodiment, the content provider has access to the user interface and the alert. After the alert is sent to the user interface, the method ends.

Figure 7:
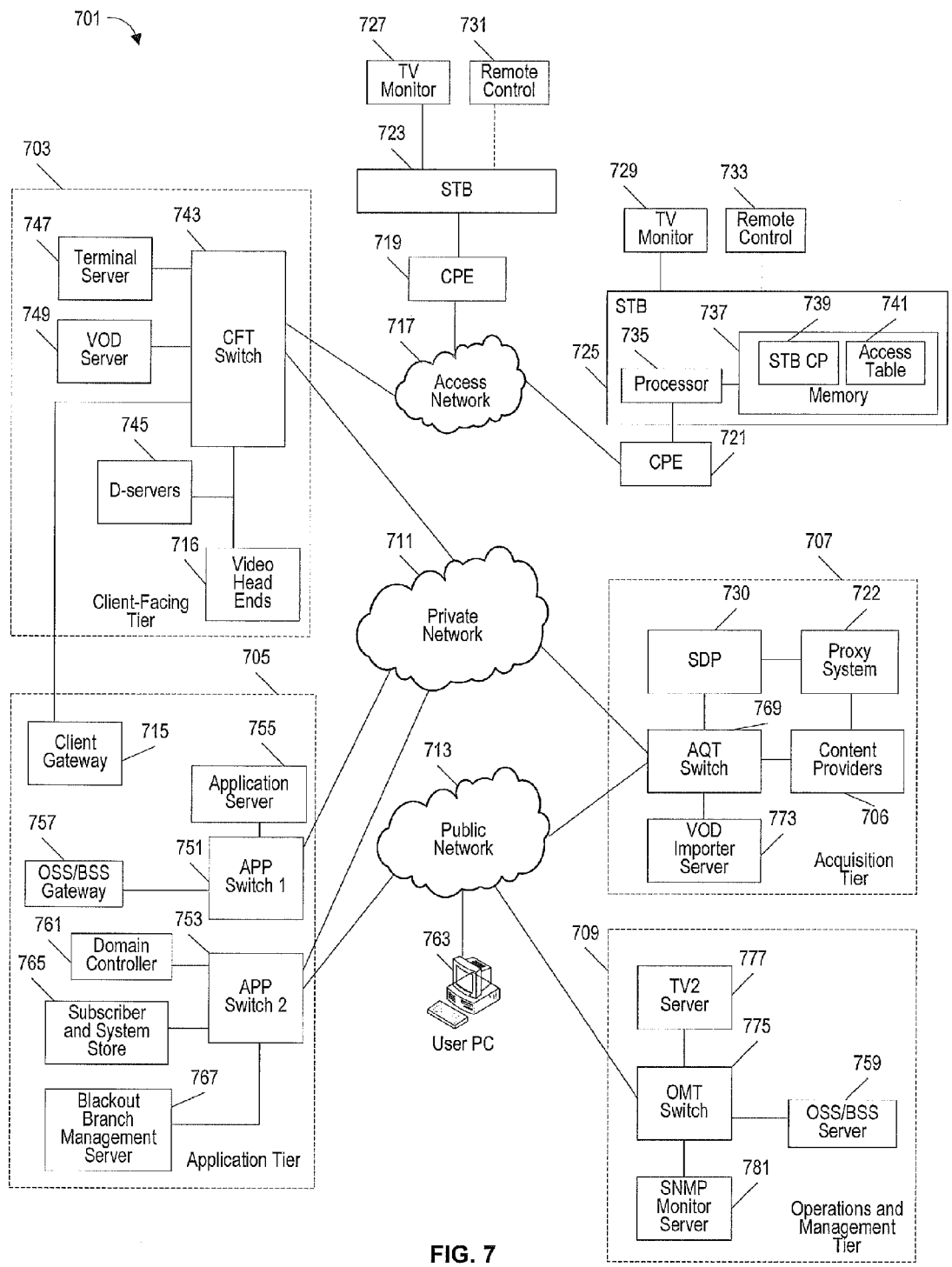
FIG. 7 is a block diagram of a particular embodiment of a video distribution system that includes a system to validate restriction event control streams.

Referring to FIG. 7, an illustrative embodiment of an Internet Protocol Television (IPTV) system generally designated 701 is shown. In a particular illustrative embodiment, a video distribution system as discussed with reference to FIG. 1 and FIG. 2, may include elements of a system, such as the IPTV system 701. As shown, the system 701 may include a client facing tier 703, an application tier 705, an acquisition tier 707, and an operations and management tier 709. Each tier 703, 705, 707, 709 is coupled to a private network 711; to a public network 713, such as the Internet; or to both the private network 711 and the public network 713. For example, the client-facing tier 703 may be coupled to the private network 711. Further, the application tier 705 may be coupled to the private network 711 and to the public network 713. The acquisition tier 707 may also be coupled to the private network 711 and to the public network 713. Additionally, the operations and management tier 709 may be coupled to the public network 713.

As illustrated in FIG. 7, the various tiers 703, 705, 707, 709 communicate with each other via the private network 711 and/or the public network 713. For instance, the client-facing tier 703 may communicate with the application tier 705 and the acquisition tier 707 via the private network 711. The application tier 705 may communicate with the acquisition tier 707 via the private network 711. Further, the application tier 705 may communicate with the acquisition tier 707 and the operations and management tier 709 via the public network 713. Moreover, the acquisition tier 707 may communicate with the operations and management tier 709 via the public network 713. In a particular embodiment, elements of the application tier 705, including, but not limited to, a client gateway 715, may communicate directly with the client-facing tier 703.

The client-facing tier 703 may communicate with user equipment via an access network 717, such as an Internet Protocol Television (IPTV) access network. In an illustrative embodiment, customer premises equipment (CPE) 719, 721 may be coupled to a local switch, router, modem, or other device of the access network 717. The client-facing tier 703 may communicate with a first representative set-top box device 723 via the first CPE 719 and with a second representative set-top box device 725 via the second CPE 721. In a particular embodiment, the first representative set-top box device 723 and the first CPE 719 may be located at a first customer (or subscriber) premise, and the second representative set-top box device 725 and the second CPE 721 may be located at a second customer (or subscriber) premise. In another particular embodiment, the first representative set-top box device 723 and the second representative set-top box device 725 may be located at a single customer premise, each coupled to one of the CPE 719, 721. The CPE 719, 721 may include routers, local area network devices, modems, such as digital subscriber line (DSL) modems, any other suitable devices for facilitating communication between a set-top box device and the access network 717, or any combination thereof.

In an exemplary embodiment, the client-facing tier 703 may be coupled to the CPE 719, 721 via fiber optic cables. In another exemplary embodiment, the CPE 719, 721 may include digital subscriber line (DSL) modems that are coupled to one or more network nodes via twisted pairs, and the client-facing tier 703 may be coupled to the network nodes via fiber-optic cables. Each set-top box device 723, 725 may process data received via the access network 717, via an IPTV software platform, such as Microsoft® TV IPTV Edition.

The first set-top box device 723 may be coupled to a first external display device, such as a first television monitor 727, and the second set-top box device 725 may be coupled to a second external display device, such as a second television monitor 729. Moreover, the first set-top box device 723 may communicate with a first remote control 731, and the second set-top box device 725 may communicate with a second remote control 733. The set-top box devices 723, 725 may include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 723, 725 may receive data, video, or any combination thereof, from the client-facing tier 703 via the access network 717 and render or display the data, video, or any combination thereof, at the display device 727, 729 to which it is coupled. In an illustrative embodiment, the set-top box devices 723, 725 may include tuners that receive and decode television programming signals or packet streams for transmission to the display devices 727, 729. Further, the set-top box devices 723, 725 may include a STB processor 735 and a STB memory device 737 that is accessible to the STB processor 735. In one embodiment, a computer program, such as the STB computer program 739, may be embedded within the STB memory device 737. Additionally, in a particular embodiment, the set-top box devices 723, 725 may include an access table 741. The access table 741 may include information used by the set-top box devices 723, 725 to implement restriction events (e.g., blackouts). For example, the access table 741 may include a matrix that maps services (e.g., media streams) to particular channels or media services (e.g., a picture-in-picture service).

In an illustrative embodiment, the STB computer program 739 includes instructions that cause set-top box devices 723, 725 to implement scheduled restriction events based on the access table 741. For example, the set-top box devices 723, 725 may tune from a first service to a second service, based on the access table 741, to implement a restriction event.

In an illustrative embodiment, the client-facing tier 703 may include a client-facing tier (CFT) switch 743 that manages communication between the client-facing tier 703 and the access network 717 and between the client-facing tier 703 and the private network 711. As illustrated, the CFT switch 743 is coupled to one or more data servers, such as image and data servers ("D-servers") 745, that store, format, encode, replicate, or otherwise manipulate or prepare video content for communication from the client-facing tier 703 to the set-top box devices 723, 725. The CFT switch 743 may also be coupled to a terminal server 747 that provides terminal devices with a connection point to the private network 711. In a particular embodiment, the CFT switch 743 may be coupled to a video-on-demand (VOD) server 749 that stores or provides VOD content imported by the IPTV system 701. Further, the CFT switch 743 is coupled to one or more video head ends 716 that receive video content and transmit the content to the set-top boxes 723, 725 via the access network 717. Each of the one or more video heads 716 may receive a substitution table from the acquisition tier 707 through the private network 711 and the CFT switch 743. The one or more video heads 716 may generate access tables from the substitution table and send the access tables to the set-top box devices 723, 725 in the regions serviced by the one or more video heads 716 using CFT switch 743

In an illustrative embodiment, the client-facing tier 703 may communicate with a large number of set-top boxes, such as the representative set-top boxes 723, 725 over a wide geographic area, such as a metropolitan area, a viewing area, a statewide area, a regional area, a nationwide area or any other suitable geographic area, market area, or subscriber or customer group that may be supported by networking the client-facing tier 703 to numerous set-top box devices. In a particular embodiment, the CFT switch 743, or any portion thereof, may include a multicast router or switch that communicates with multiple set-top box devices via a multicast-enabled network.

As illustrated in FIG. 7, the application tier 705 may communicate with both the private network 711 and the public network 713. The application tier 705 may include a first application tier (APP) switch 751 and a second APP switch 753. In a particular embodiment, the first APP switch 751 may be coupled to the second APP switch 753. The first APP switch 751 may be coupled to an application server 755 and to an OSS/BSS gateway 757. In a particular embodiment, the application server 755 may provide applications to the set-top box devices 723, 725 via the access network 717, which enable the set-top box devices 723, 725 to provide functions, such as interactive program guides, video gaming, display, messaging, processing of VOD material and other IPTV content, etc. In an illustrative embodiment, the application server 755 provides location information to the set-top box devices 723, 725. In a particular embodiment, the OSS/BSS gateway 757 includes operation systems and support (OSS) data, as well as billing systems and support (BSS) data. In one embodiment, the OSS/BSS gateway 757 may provide or restrict access to an OSS/BSS server 759 that stores operations and billing systems data.

The second APP switch 753 may be coupled to a domain controller 761 that provides Internet access, for example, to users at their computers 763 or via the public network 713. For example, the domain controller 761 may provide remote Internet access to IPTV account information, e-mail, personalized internet services, messaging services or other online services via the public network 713. In addition, the second APP switch 753 may be coupled to a subscriber and system store 765 that includes account information, such as account information that is associated with users who access the IPTV system 701 via the private network 711 or the public network 713. In an illustrative embodiment, the subscriber and system store 765 may store subscriber or customer data and create subscriber or customer profiles that are associated with IP addresses, stock-keeping unit (SKU) numbers, other identifiers, or any combination thereof, of corresponding set-top box devices 723, 725. In another illustrative embodiment, the subscriber and system store 765 may store data associated with capabilities of set-top box devices associated with particular customers. The application tier 705 may also include a blackout branch management server 767 that determines, based on a geographic area information associated with each of the set-top box devices 723, 725, which set-top box devices 723, 725 should implement particular restriction events. Based on information from the blackout branch management server 767, appropriate access tables 741 may be sent to the affected set-top box devices 723, 725.

In a particular embodiment, the application tier 705 includes a client gateway 715 that communicates data directly to the client-facing tier 703. In this embodiment, the client gateway 715 is coupled directly to the CFT switch 743. The client gateway 715 may provide user access to the private network 711 and the tiers coupled thereto. In an illustrative embodiment, the set-top box devices 723, 725 may access the IPTV system 701 via the access network 717, using information received from the client gateway 715. User devices may access the client gateway 715 via the access network 717, and the client gateway 715 may allow such devices to access the private network 711 once the devices are authenticated or verified. Similarly, the client gateway 715 may prevent unauthorized devices, such as hacker computers or stolen set-top box devices from accessing the private network 711, by denying access to these devices beyond the access network 717.

For example, when the first representative set-top box device 723 accesses the client-facing tier 703 via the access network 717, the client gateway 715 may verify subscriber information by communicating with the subscriber and system store 765 via the private network 711. Further, the client gateway 715 may verify billing information and status by communicating with the OSS/BSS gateway 757 via the private network 711. In one embodiment, the OSS/BSS gateway 757 may transmit a query via the public network 713 to the OSS/BSS server 759. After the client gateway 715 confirms subscriber and/or billing information, the client gateway 715 may allow the set-top box device 723 to access IPTV content and VOD content at the client-facing tier 703. If the client gateway 715 cannot verify subscriber information for the set-top box device 723, e.g., because it is connected to an unauthorized twisted pair, the client gateway 715 may block transmissions to and from the set-top box device 723 beyond the access network 717.

As indicated in FIG. 7, the acquisition tier 707 includes an acquisition tier (AQT) switch 769 that communicates with the private network 711. The AQT switch 769 may also communicate with the operations and management tier 709 via the public network 713. In a particular embodiment, the AQT switch 769 may be coupled to content providers 706 that receives or acquires television content, movie content, advertisement content, other video content, or any combination thereof, from a broadcast service, such as a satellite acquisition system or satellite head-end office. In a particular embodiment, the content providers 706 may transmit content to the AQT switch 769, and the AQT switch 769 may transmit the content to the CFT switch 743 via the private network 711.

In an illustrative embodiment, content may be transmitted to the D-servers 745, where it can be encoded, formatted, stored, replicated, or otherwise manipulated and prepared for communication from the video head end(s) 716 to the set-top box devices 723, 725. The CFT switch 743 may receive content from the video head end(s) 716 and communicate the content to the CPE 719, 721 via the access network 717. The set-top box devices 723, 725 may receive the content via the CPE 719, 721, and may transmit the content to the television monitors 727, 729. In an illustrative embodiment, video or audio portions, or both, of the content may be streamed to the set-top box devices 723, 725.

The content provider may provide control streams for restriction events to a proxy system 722. The proxy system 722 may format the control streams and provide formatted control streams to a service delivery platform (SDP) 730. The SDP 730 may separate the formatted control streams into data elements. The SDP 730 may validate each control stream by checking that a content proxy that sent the control stream to the SDP 730 is in a mapping table and checking that a virtual network identifier of the control stream is associated with the content proxy in the mapping table. The SDP 730 may log all control streams in a database. The SDP 730 may provide an alarm when an invalid control stream is detected. The SDP 730 may update a substitution table with data from the control streams when the control streams are valid. The SDP may send the substitution table to the AQT switch 769. The AQT switch 769 may send the substitution table through the private network 711 to the CFT switch 743. The CFT switch 743 may provide the substitution table to the video head ends 716.

Further, the AQT switch 769 may be coupled to a video-on-demand importer server 773 that receives and stores television or movie content received at the acquisition tier 707 and communicates the stored content to the VOD server 749 at the client-facing tier 703 via the private network 711. Additionally, at the acquisition tier 707, the video-on-demand (VOD) importer server 773 may receive content from one or more VOD sources outside the IPTV system 701, such as movie studios and programmers of non-live content. The VOD importer server 773 may transmit the VOD content to the AQT switch 769, and the AQT switch 769, in turn, may communicate the material to the CFT switch 743 via the private network 711. The VOD content may be stored at one or more servers, such as the VOD server 749.

When users issue requests for VOD content via the set-top box devices 723, 725, the requests may be transmitted over the access network 717 to the VOD server 749, via the CFT switch 743. Upon receiving such requests, the VOD server 749 may retrieve the requested VOD content and transmit the content to the set-top box devices 723, 725 across the access network 717, via the CFT switch 743. The set-top box devices 723, 725 may transmit the VOD content to the television monitors 727, 729. In an illustrative embodiment, video or audio portions, or both, of VOD content may be streamed to the set-top box devices 723, 725.

FIG. 7 further illustrates that the operations and management tier 709 may include an operations and management tier (OMT) switch 775 that conducts communication between the operations and management tier 709 and the public network 713. In the embodiment illustrated by FIG. 7, the OMT switch 775 is coupled to a TV2 server 777. Additionally, the OMT switch 775 may be coupled to an OSS/BSS server 759 and to a simple network management protocol (SNMP) monitor server 781 that monitors network devices within or coupled to the IPTV system 701.

In an illustrative embodiment, the content providers 706 may transmit content to the AQT switch 769, and the AQT switch 769, in turn, may transmit the content to the OMT switch 775 via the public network 713. In this embodiment, the OMT switch 775 may transmit the content to the TV2 server 777 for display to users accessing the user interface at the TV2 server 777. For example, a user may access the TV2 server 777 using a personal computer 763 coupled to the public network 713.

In conjunction with the configuration of structure provided herein, a system and method of restricting access to media content are provided in which automated, software-based scheduling and execution of restriction events occur based on control streams that are received and parsed at a service delivery platform or other conditional access provisioning system of a video distribution network, such as an Internet Protocol Television (IPTV) network. The control streams may be validated. Valid control streams may be used to update a substitution table that is used to generate access tables that are sent to set-top box devices. The access tables may dictate what service is retrieved when a user tunes a set-top box device to a particular channel. Invalid control signals may be logged and may raise an alarm to operators of a video distribution system, a content provider, or both. In other embodiments, the system and method may be applied to a cable network, a satellite dish network, or other video distribution network adapted to deliver video traffic via similar architectures.

Figure 8:
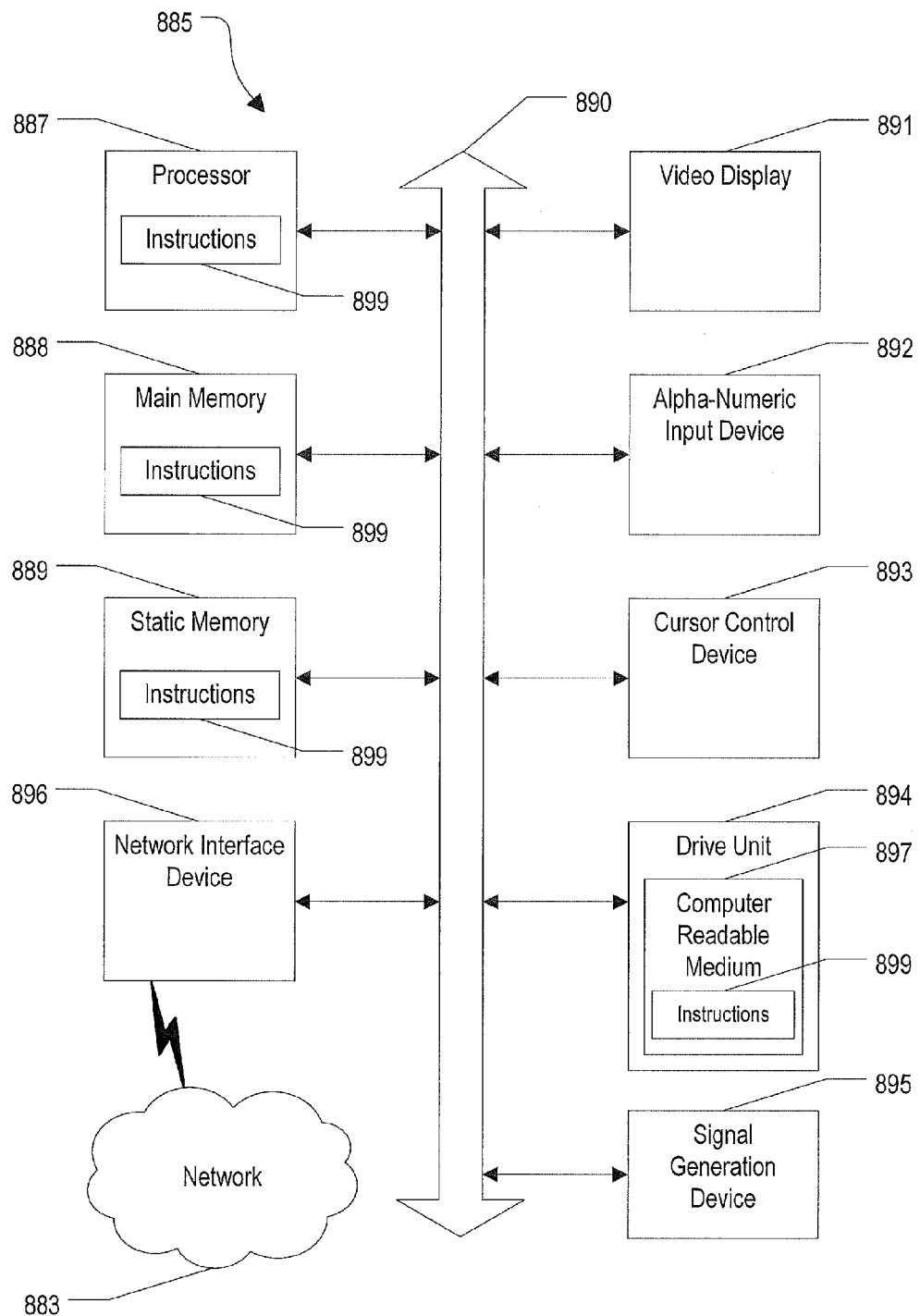
FIG. 8 is a block diagram of an illustrative embodiment of a general computer system.

Referring to FIG. 8, an illustrative embodiment of a general computer system is shown and is designated 885. The computer system 885 may include a set of instructions that can be executed to cause the computer system 885 to perform any one or more of the methods or computer based functions disclosed herein. The computer system 885 may be connected, e.g., using a network, to other computer systems or peripheral devices. For example, the computer system may include or be included within any one or more of the SHE 102, 202; IRDs 108, 208; A-servers 114, 214; content proxies 124, 126, 224; SDPs 130, 230; VHEs 116-120, 216; and STB devices 246 discussed with reference to FIGS. 1 and 2.

In a networked deployment, the computer system 885 may operate in the capacity of a server or as a client user computer in a server-client user network environment, or as a peer computer system in a peer-to-peer (or distributed) network environment. The computer system 885 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 885 may be implemented using electronic devices that provide video, audio, or data communication. Further, while a single computer system 885 is illustrated, the term "system" shall also be taken to include any collection of systems or sub-systems that individually or jointly execute a set, or multiple sets, of instructions to perform one or more computer functions.

As illustrated in FIG. 8, the computer system 885 may include a processor 887, e.g., a central processing unit (CPU), a graphics processing unit (GPU), or both. Moreover, the computer system 885 may include a main memory 888 and a static memory 889, which can communicate with each other via a bus 890. As shown, the computer system 885 may further include a video display unit 891, such as a liquid crystal display (LCD), a projection television system, a flat panel display, a solid state display, or a cathode ray tube (CRT). Additionally, the computer system 885 may include an input device 892, such as a keyboard, and a cursor control device 893, such as a mouse. The computer system 885 may also include a disk drive unit 894, a signal generation device 895, such as a speaker or remote control, and a network interface device 896.

In a particular embodiment, as depicted in FIG. 8, the disk drive unit 894 may include a computer-readable storage medium 897 in which one or more sets of instructions 899, e.g. software, can be embedded. Further, the instructions 899 may embody one or more of the methods or logic as described herein. In a particular embodiment, the instructions 899 may reside completely, or at least partially, within the main memory 888, the static memory 889, and/or within the processor 887 during execution by the computer system 885. The main memory 888 and the processor 887 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 899 or receives, stores and executes instructions 899 responsive to a propagated signal, so that a device connected to a network 883 may communicate voice, video or data over the network 883. Further, the instructions 899 may be transmitted or received over the network 883 via the network interface device 896.

While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving a control stream at a media service delivery platform;
determining whether the control stream is valid based on a comparison of first restriction event information included in the control stream to second restriction event information stored in a mapping table, wherein the first restriction event information comprises a proxy identifier data element, wherein the second restriction event information comprises a content proxy identifier, and wherein the control stream is determined to be valid when the first restriction event information corresponds to the second restriction event information;
updating substitution information in response to a determination that the control stream is valid; and
sending a portion of the substitution information from the media service delivery platform to a video head end.

2. The method of claim 1, further comprising: in response to a determination that the control stream is invalid, creating a log entry associated with the control stream in a database; and in response to the determination that the control stream is invalid, generating an alert indicating that the control stream is invalid.

3. The method of claim 1, wherein the updated substitution information identifies a media service to be provided to a geographic region based on the first restriction event information.

4. The method of claim 1, wherein the substitution information is included in a substitution table.

5. The method of claim 3, wherein the video head end is configured to provide the media service to customer premises equipment devices within the first geographic region.

6. The method of claim 3, wherein the first restriction event information indicates that a second media service is to be blacked out in the geographic region, and wherein the media service is to be provided to the geographic region as a substitute for the second media service.

7. The method of claim 1, wherein the first restriction event information is associated with a blackout of a media service.

8. The method of claim 7, wherein the media service is associated with a media stream of a sporting event.

9. A computer-readable storage device comprising instructions that, when executed by a processor, cause the processor to perform operations including:
receiving a control stream;
determining whether the control stream is valid based on a comparison of first restriction event information included in the control stream to second restriction event information stored in a mapping table, wherein the first restriction event information comprises a virtual network identifier data element, wherein the second restriction event information comprises a content proxy identifier, and wherein the control stream is determined to be valid when the first restriction event information is associated with the second restriction event information;
updating substitution information in response to a determination that the control stream is valid; and
sending a portion of the substitution information to a video head end.

10. The computer-readable storage device of claim 9, wherein the operations further include creating a log entry in a database indicating that the control stream is valid in response to a determination that the control stream is valid.

11. The computer-readable storage device of claim 9, wherein the updated substitution information identifies a media service to be provided to a geographic region based on the first restriction event information.

12. The computer-readable storage device of claim 9, wherein the first restriction event information is associated with a black out of a media stream in a particular geographic region.

13. The computer-readable storage device of claim 12, wherein the first restriction event information identifies the particular geographic region, a virtual network identifier associated with a virtual network, and a time to implement the black out of the media stream in the particular geographic region, and wherein the virtual network is associated with a channel that is to carry the media stream.

14. The computer-readable storage device of claim 9, wherein the operations further include creating a log entry in a database in response to a determination that the control stream is invalid.

15. The computer-readable storage device of claim 9, wherein the operations further include generating an alert in response to a determination that the control stream is invalid.

16. A system comprising:
a processor; and
a memory storing instructions that, when executed by the processor, cause the processor to perform operations including: receiving a control stream; determining whether the control stream is valid based on a comparison of first restriction event information included in the control stream to second restriction event information stored in a mapping table, wherein the first restriction event information comprises a proxy identifier data element, wherein the second restriction event information comprises a content proxy identifier, and wherein the control stream is determined to be valid when the first restriction event information corresponds to the second restriction event information;
updating substitution information in response to a determination that the control stream is valid; and
initiating transmission of a portion of the substitution information to a head end.

17. The system of claim 16, wherein the updated substitution information identifies a media service to be provided to a geographic region based on the first restriction event information.

18. The system of claim 16, wherein the control stream is received at the processor from the head end.

19. The system of claim 16, wherein the first restriction event information is associated with a black out of a media stream in a particular geographic region.

20. The system of claim 16, wherein the first restriction event information is associated with a black out of a first media service in geographic regions, and wherein the first restriction information identifies a second media service to be provided to the geographic regions as a substitute for the first media service.

* * * * *